INVENTOR.
HAROLD R. WALKER
AGENT

May 16, 1961    H. R. WALKER    2,984,786
PHASE COMPARATOR
Filed Aug. 31, 1959    2 Sheets-Sheet 2

United States Patent Office 2,984,786
Patented May 16, 1961

2,984,786

PHASE COMPARATOR

Harold R. Walker, Warminster, Pa.
(739 Cypress Road, Hatboro, Bucks County, Pa.)

Filed Aug. 31, 1959, Ser. No. 837,305

7 Claims. (Cl. 324—89)

(Granted under Title 35, U.S. Code (1952), sec. 266)

The invention described herein may be manufactured and used by or for the Government of the United States of America for governmental purposes without the payment of any royalties thereon or therefor.

The present invention relates generally to a phase comparator but more particularly to a means to indicate the phase difference between two signals, for example, a test signal and a reference signal.

Many methods and devices are known to indicate the phase difference between two or more signals of sine or other recurring waveform, for example the generation of Lissajous patterns on the screen of a cathode ray oscilloscope or the use of null type meter circuits. These methods and devices are characterized by undue complexity or unreliability.

The present invention is embodied in a simple and reliable circuit including a bi-stable multivibrator caused to assume one of two stable states by a pulse chain generated in accordance with a composite signal comprising a reference signal and a gated signal derived from the reference signal and a test signal wherein it is desired to determine the phase difference between the reference signal and the test signal. Means are provided to shift the phase of one of the two signals to obtain phase co-incidence therebetween. The out of phase condition is indicated by the multivibrator assuming one or the other of the stable states, whereas the phase co-incidence condition is indicated by the multivibrator assuming in succession alternate stable states. The degree of phase shift required to produce phase co-incidence is utilized to determine the phase difference between the two signals.

It is therefore the principal object of the present invention to provide a simple and reliable means to determine the phase difference between sine or other recurring waveform signals.

Other objects and many of the attendant advantages of the invention will be readily appreciated as the same becomes better understood by reference to the following detailed description of an illustrative embodiment thereof when considered in connection with the accompanying drawings, wherein.

Figure 1:
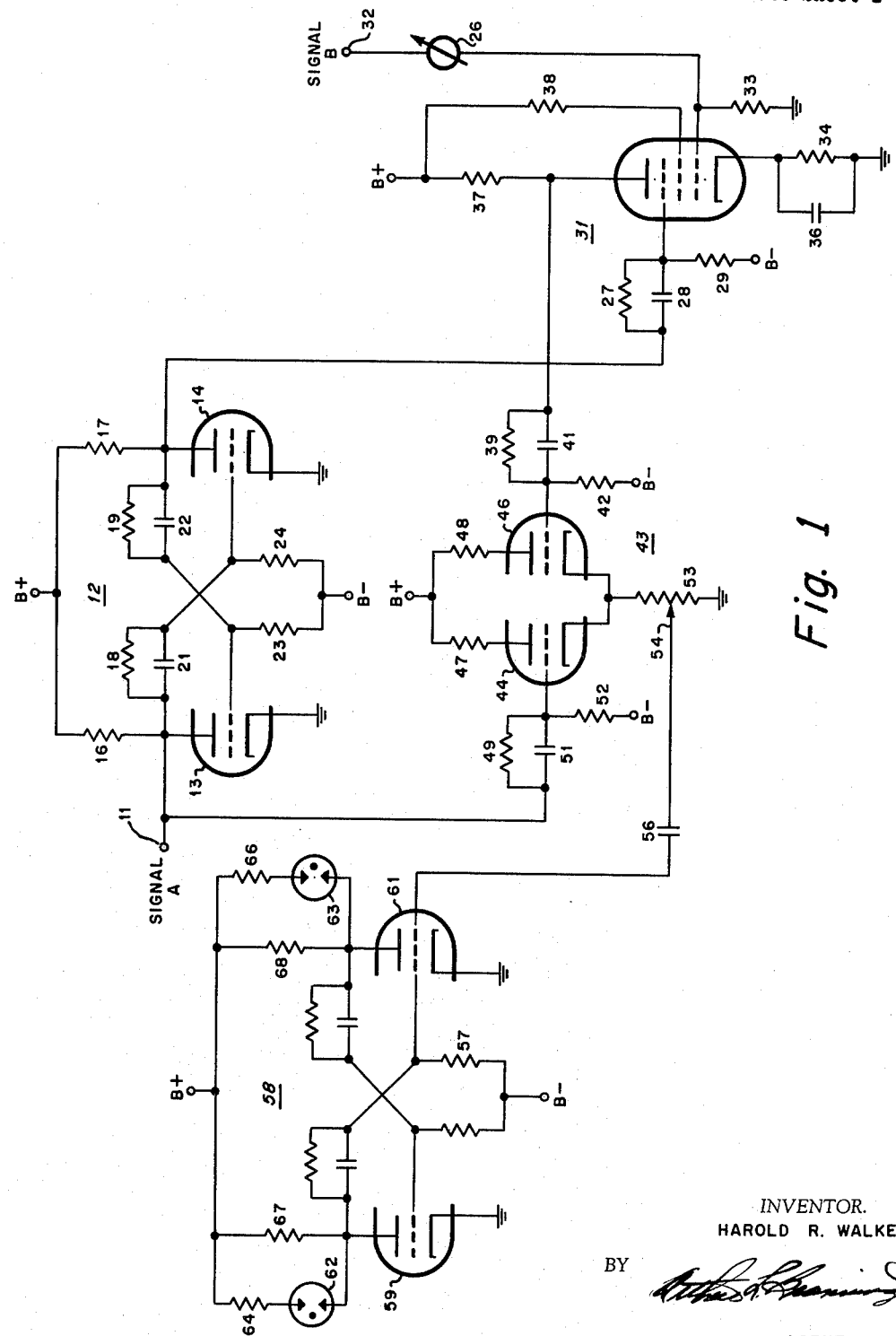
Fig. 1 is a schematic circuit diagram of an embodiment of the invention.

Referring now to Fig. 1, it may be seen that a reference signal A may be applied to a terminal 11 coupled to a bi-stable resistance coupled multivibrator of the Eccles-Jordan type generally indicated by the reference numeral 12. Multivibrator 12 includes a pair of triode sections 13, 14. The anodes of triodes 13, 14 are conventionally coupled through load resistors 16, 17 to a B+ supply and the cathodes thereof are coupled to ground or to another convenient reference potential.

The anodes and grids of triodes 13, 14 are cross-coupled in typical multivibrator fashion through resistors 18, 19, provided with high frequency bypass capacitors 21, 22, while the grids of triodes 13, 14 are further coupled through resistors 23, 24 to a B— supply.

An output signal, taken for example from the anode of triode 14, is coupled through a coupling network comprising a resistor 27 provided with a high frequency bypass capacitor 28 and applied across a resistor 29 to a control grid of a gated amplifier generally indicated by the reference numeral 13. Input resistor 29 is coupled to a B— supply.

Gated amplifier 31 may be a dual control pentode or a beam tube, for example type 6BN6. Test signal B may be coupled from a terminal 32 through a phase shifting synchro or other phase shifting device 26 and applied across a resistor 33 to another control grid of gated amplifier 31. The cathode of tube 31 may be coupled through a self biasing network comprising a resistor 34 and a bypass capacitor 36 to ground or to some other point of reference potential, while the anode and the remaining control grid thereof may be coupled, respectively, through resistors 37, 38 to the B+ power supply. The output signal from gated amplifier 31 is coupled through a network comprising resistor 39 and high frequency bypass capacitor 41 and applied across a resistor 42 as one of two inputs to an on-off gating circuit generally indicated by the reference numeral 43.

On-off gating circuit 43 comprises a pair of triode sections 44, 46 having the anodes thereof coupled respectively through resistors 47, 48 to the B+ supply. Reference signal A is coupled from terminal 11 through a network comprising resistor 49 provided with a high frequency bypass capacitor 51 and applied across a resistor 52 as the second input to on-off gating circuit 43. Input resistors 42, 52 are coupled to the B— supply to provide proper bias levels for triode sections 44, 46. The cathodes of triode sections 44, 46 are coupled in common to one terminal of a potentiometer 43, the other terminal of which may be connected to ground. A portion of the cathode follower output signal from on-off gating circuit 43 is coupled from wiper 54 of potentiometer 53 through a differentiating circuit comprising a capacitor 56 and a resistor 57 and applied as a control signal to a second multivibrator, generally indicated by the reference numeral 58.

Multivibrator 58 which includes a pair of triode sections 59, 61 is similar in all respects to multivibrator 12 and therefore will not be described in detail.

According to the invention, indicating, sensing, control means, or the like, are coupled to be energized by the output signal or signals from multivibrator 58. In the particular embodiment illustrated, neon lamps 62, 63 are connected in series with current limiting resistors 64, 66 across anode resistors 67, 68 to respectively indicate the conducting or non-conducting state of triode sections 59, 61.

Figure 2:
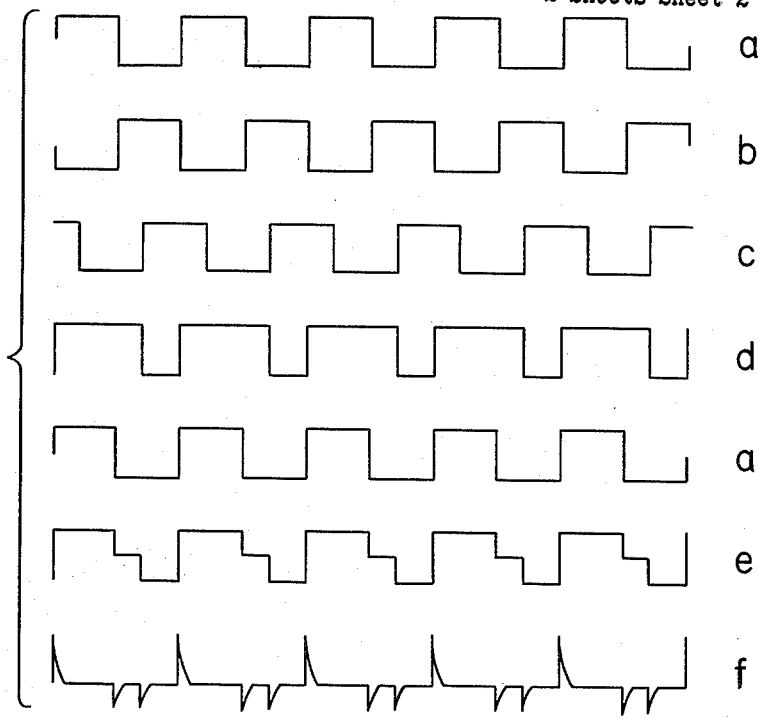
Fig. 2 illustrates certain waveforms occurring in the circuit of Fig. 1 when the phase of the test signal leads the phase of the reference signal.
Figure 3:
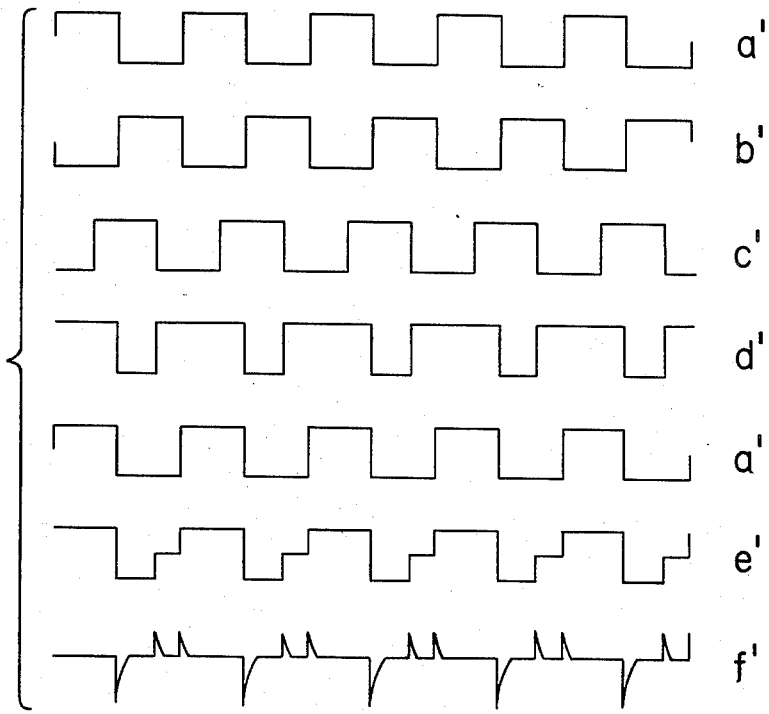
Fig. 3 illustrates corresponding waveforms occurring in the circuit of Fig. 1 when the phase of the test signal lags that of the reference signal.

While an illustrative embodiment of the invention has been described in detail above, the operation thereof may be better understood by reference to Figs. 2 and 3 which illustrate certain waveforms occurring in the circuit of Fig. 1 when the phase of test signal B, respectively, leads and lags the phase of reference signal A.

Referring now to Fig. 2, it may be seen that multivibrator 12 generates a signal waveform $b$, 180° out of phase with reference signal A, waveform $a$. Gated amplifier 31 will conduct only upon the concurrent positive excursion of the output signal from multivibrator 12 and test signal B, waveforms $a$ and $c$, and will therefore provide an output signal having the waveshape indicated in waveform $d$. The cathode coupling of triode sections 44, 46, in effect, produces a summation of signal A and the output signal from gated amplifier 31 to produce an output signal appearing across potentiometer 53 having the character indicated in waveform *e* which upon differentiation becomes waveform *f*.

Assuming that triode section 59 is initially conducting, the positive portions of waveform *f* will cause multibrator 58 to flip to its alternate stable state, triode section 61 conducting and triode section 59 non-conducting. The negative portions of waveform *f* are of insufficient amplitude to cause a change in state of multivibrator 58. If triode section 61 is initially conducting, multivibrator 58 will, of course, remain in this state. The above described condition will be indicated by neon lamp 63 being on and neon lamp 62 being off.

Referring now to Fig. 3, it may be seen that the waveforms corresponding to those illustrated in Fig. 2 have been indicated by primed reference letters. By making an analysis similar to that above described, it will be apparent that when signal B lags signal A in phase triode section 59 will be placed or maintained in a conducting state and that this condition will be indicated by neon lamp 62 being on and neon lamp 63 being off.

Phase co-incidence between signal A and the output signal from gated amplifier 31 may be obtained by appropriate adjustment of phase shifter 26 and this condition will be indicated by the alternate flashing of neon lamps 62, 63. Phase shifter 26 may conveniently be provided with a scale calibrated in degrees and neon lamps 62, 63 may be labeled lag and lead, respectively. To eliminate 180° ambiguity, neon lamps 62, 63 and phase shifter 26 may, in addition, be marked increase and decrease.

Signals of square waveform have been selected to illustrate the mode of operation of the present invention but the invention is equally applicable to the measurement of the phase difference between modulated or unmodulated signals of sine waveform. Additional input stages, not shown, such as demodulators and amplifier clippers may be provided if desired.

Obviously many modifications and variations of the present invention are possible in light of the above teachings. It is therefore to be understood that within the scope of the appended claims the invention may be practiced otherwise than as specifically described.

What is claimed is:

1. A phase comparator comprising: a first input terminal having applied thereto a first input signal of recurring waveform; first signal generating means having an input circuit coupled to said first input terminal and operable to generate an output signal in phase opposition to said first signal; a gating amplifier having an output circuit and including at least first and second control elements; circuit means coupling said output signal from said first signal generating means to said first control element; a second input terminal having applied thereto a second input signal of recurring waveform; circuit means coupling said second input terminal to said second control element; summing means having an output circuit and having an input circuit coupled to said first terminal and to the output circuit of said gating amplifier; second signal generating means having an input circuit coupled to the output circuit of said summing means and operable to generate one output signal when the phase of said first input signal lags the phase of said second input signal and another output signal when the phase of said first input signal leads the phase of said second input signal; indicating means coupled to be energized by the output signals from said second signal generating means; and means to vary the phase difference btween said first and second input signals.

2. The combination of claim 1 wherein said second signal generating means comprises a bi-stable resistance coupled multivibrator and wherein said indicating means comprises a first neon lamp coupled to said multivibrator to be energized when said multivibrator assumes one stable state and a second neon lamp coupled to said multivibrator to be energized when said multivibrator assumes the other stable state.

3. The combination of claim 2 wherein said summing means comprises a pair of amplifier stages each including a cathode and each including control element respectively coupled to said first input terminal and to the output circuit of said gating means and wherein the output circuit of said summing means comprises a potentiometer with the resistive portion thereof connected to couple the cathodes of said amplifier stages in common to a point of reference potential; and wherein there is further provided a differentiating circuit connected to couple the wiper of said potentiometer to the input circuit of said second signal generating means.

4. The combination of claim 3 wherein said first signal generating means comprises a bi-stable resistance coupled multivibrator; and wherein there is further provided phase shifting means connected between said second input terminal and said second control element.

5. A phase comparator comprising: a bi-stable resistance coupled multivibrator including first and second triode sections having the cathodes thereof coupled to a source of bias potential, the anodes thereof coupled respectively through resistors to a source of positive potential, and the anode-grid circuits thereof cross-coupled in multivibrator fashion; indicating means coupled to the anode circuits of said triode sections; first and second input terminals having respectively applied thereto first and second input signals of recurring waveform; pulse generating means having an input circuit coupled to said first and second input terminals, an output circuit coupled to an anode-grid circuit of said multivibrator, and operable to generate a predominately positive pulse chain when the phase of said first input signal lags the phase of said second input signal and a predominately negative pulse chain when the phase of said first input signal leads the phase of said second input signal; and means operable to continuously vary the phase difference between said first and second input signals; said pulse generating means comprising a phase inverter having an output circuit and having an input circuit coupled to said first input terminal, gating means having an output circuit and having a control circuit coupled to the output circuit of said phase inverter and to said second input terminal, summing means having an input circuit coupled to the output circuit of said gating means and to said first input terminal and having an output circuit including differentiating means coupled to said anode-grid circuit of said multivibrator.

6. The combination of claim 5 wherein said indicating means comprises a first neon lamp connected in series with a current limiting resistor across one anode resistor of said multivibrator and a second neon lamp connected in series with a current limiting resistor across the other anode resistor of said multivibrator; and wherein said means to vary the phase difference between said first and second input signals comprises a phase shifter connected between said second input terminal and the control circuit of said gating means.

7. A phase comparator comprising: a first terminal, a first bi-stable resistance coupled multivibrator including a pair of triode sections and having an anode-grid circuit thereof coupled to said first terminal; a pentode provided with an anode circuit; circuit means coupling an anode circuit of said first multivibrator to a control grid of said pentode; a second terminal; a phase shifter; circuit means coupling said phase shifter to said second terminal and to another control grid of said pentode; a potentiometer; a pair of triode sections having the cathodes thereof coupled in common through the resistive portion of said potentiometer to a point of reference potential and circuit means coupling the control grid of one of said triode sections to said first terminal and the control grid of the other of said triode sections to the anode circuit of said pentode; a second bi-stable resistance coupled multivibrator including a pair of triode sections; circuit means including differentiating means coupling the wiper of said potentiometer to an anode-grid circuit of said second multivibrator; a first neon lamp connected across one anode resistor of said second multivibrator; and a second neon lamp connected across the other anode resistor of said second multivibrator.

References Cited in the file of this patent

UNITED STATES PATENTS

| | | |
|---|---|---|
| 2,563,879 | Soukaras | Aug. 14, 1951 |
| 2,644,133 | Soukaras | June 30, 1953 |
| 2,794,952 | Golden | June 4, 1957 |
| 2,795,695 | Raynsford | June 11, 1957 |
| 2,858,425 | Gordon | Oct. 28, 1958 |
| 2,862,180 | Smith | Nov. 25, 1958 |
| 2,863,180 | Graustein | Dec. 2, 1958 |
| 2,904,683 | Meyer | Sept. 15, 1959 |
| 2,940,042 | Fisher | June 7, 1960 |

OTHER REFERENCES

"Measuring Phase at RF," article in Electronics, January 1956, pages 138–140.